United States Patent [19]

Klein

[11] 4,094,828
[45] June 13, 1978

[54] RIGID POLYURETHANE FOAMS
[75] Inventor: Howard P. Klein, Austin, Tex.
[73] Assignee: Texaco Development Corporation, New York, N.Y.
[21] Appl. No.: 728,486
[22] Filed: Sep. 30, 1976
[51] Int. Cl.² ............................................. C08G 18/62
[52] U.S. Cl. ....................... 260/2.5 AM; 260/2.5 AP
[58] Field of Search .................. 260/2.5 AP, 2.5 AM

[56] References Cited
U.S. PATENT DOCUMENTS

| | | | |
|---|---|---|---|
| 2,965,615 | 12/1960 | Tess | 260/2.5 AM |
| 3,025,268 | 3/1962 | Deex et al. | 260/2.5 AM |
| 3,252,943 | 5/1966 | Dankert et al. | 260/2.5 AP |

Primary Examiner—M. J. Welsh
Attorney, Agent, or Firm—Carl G. Ries; Thomas H. Whaley; James L. Bailey

[57] ABSTRACT

Covers rigid polyurethane foams possessing unusual dimensional stability and heat distortion properties. Said foams are obtained by reacting in the presence of a blowing agent and a catalyst of polyurethane formation, an organic polyisocyanate and a polyol combination comprising 5-85 percent by weight of a copolymer of allyl alcohol and styrene and 15-95 percent by weight of a polyether polyol having a hydroxyl number ranging from about 200 to about 800, said weight percentages being based on the total weight of said polyol combination.

15 Claims, No Drawings

RIGID POLYURETHANE FOAMS

BACKGROUND OF THE INVENTION

1. Field of the Invention

This invention pertains to the field of polyurethane foams. More particularly, this invention relates to the use of a certain combination of polyols useful in preparing rigid polyurethane foams of excellent dimensional stability and heat distortion properties.

2. Description of the Prior Art

It is known to prepare foam from polyurethanes by the reaction of a polyisocyanate, a polyol and a blowing agent such as a halogenated hydrocarbon, water or both, in the presence of a catalyst. One particular area of polyurethane technology is based upon rigid polyurethane foams.

The art is replete with a wide variety of polyols useful as one of the main components in preparing polyurethanes such as polyurethane foams. As an example, U.S. Pat. No. 2,965,615 suggests use of copolymers of alkenyl-substituted aromatic compounds such as styrene, and ethylenically unsaturated monohydric alcohols such as allyl alcohol as a useful resinous polyol in urethane production. Also disclosed as useful polyol sources are alkoxylated reaction products of the above copolymers.

It has now been found that in the rigid polyurethane foam field, a special combination of polyols involving the just-mentioned allyl alcohol-styrene copolymer constituent yields a final polyurethane rigid foam of excellent dimensional stability and heat distortion properties. It has been found that use of a styrene-allyl alcohol copolymer in preparing rigid polyurethane foams leads to serious handling problems of the copolymer in that it is itself a solid. Likewise, the alkoxylated copolymer, while it can be handled in an acceptable manner, has a hydroxyl number too low to prepare suitable rigid foams.

It was therefore an object of the present invention to prepare a polyol useful in the rigid polyurethane field based on an allyl alcohol-styrene copolymer which could be conveniently handled, and yet yielded a final rigid polyurethane foam of suitable physical properties, and particularly acceptable dimensional stability and heat distortion temperature properties.

SUMMARY OF THE INVENTION

It has now been found that an extremely useful polyol combination utilizing as one component an allyl alcohol-styrene copolymer may be prepared which is particularly useful in making rigid polyurethane foams of excellent properties. The rigid polyurethane foam is obtained by reacting in the presence of a blowing agent and a catalyst of polyurethane formation, an organic polyisocyanate and a polyol combination comprising 5-85 percent by weight of a copolymer of allyl alcohol and styrene and 15-95 percent by weight of a polyether polyol having a hydroxyl number ranging from about 200 to about 800, said weight percentages being based on the total weight of said polyol combination.

DESCRIPTION OF THE PREFERRED EMBODIMENTS

The polyol combination of this invention comprises two components. The first component making up 5-85 percent by weight of the total polyol weight comprises a copolymer of allyl alcohol and styrene. Such copolymers are known materials and may be prepared conventionally as set out in the art exemplified by the aforementioned U.S. Pat. No. 2,965,615, the disclosure of which is incorporated herein fully by way of reference. Preferred allyl alcohol-styrene copolymers are those copolymers comprising 10-90 weight percent each of allyl alcohol and styrene moieties based on the total weight of the copolymer. More often the copolymer comprises 40-80 percent of allyl alcohol groups and 20-60 percent by weight of styrene groups. As set out in U.S. Pat. No. 2,965,615 due to the difference in relative polymerization reactivities of the two constituents it is necessary in all cases to use large excesses of allyl alcohol to prepare a copolymer of desired allyl alcohol to styrene ratio in the final copolymer product.

The second constituent of the overall polyol combination found particularly useful in preparing rigid polyurethane foams is a polyether polyol having a hydroxyl number of 200-800. Usually the polyether polyol comprises 15-95 percent by weight of the total polyol combination weight. Preferred polyether polyols of this type are the reaction products of a polyfunctional active hydrogen initiator and propylene oxide, ethylene oxide or mixed propylene oxide and ethylene oxide. The polyfunctional active hydrogen initiator most preferably has a functionality of 2-6.

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, polypropylene glycol, glycerine, sorbitol, and trimethylolpropane.

Such above amines or alcohols may be reacted with an alkylene oxide such as ethylene oxide, propylene oxide, or mixed ethylene oxide and propylene oxide using techniques known to those skilled in the art. Thus, for example, the reaction of alkylene oxides with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol would determine the amount of alkylene oxide used to react with the initiator. As noted above, the polyether polyols useful here have a hydroxyl number ranging from about 200 to about 800. The reaction mixture is then neutralized and water and excess reactants are stripped from the polyol. The polyether polyol may be prepared by reacting the initiator with propylene oxide or ethylene oxide, or by reacting the initiator first with propylene oxide followed by ethylene oxide or vice versa in one or more sequences to give a so-called block polymer chain or by reacting the initiator at once with propylene oxide and ethylene oxide mixture to achieve a random distribution of such alkylene oxides.

The final polyol combination more preferably comprises 40-80 percent by weight of said polyether polyol and 20-60 percent by weight of said copolymer. The polyol combination in many instances has a total hydroxyl number of 300-700 and most often has a hydroxyl number ranging from about 400 to about 600.

As noted above, in order to achieve a rigid polyurethane foam of excellent dimensional stability and high heat distortion temperature, it is important that the herein defined polyol combination be used as set out. As discussed above, use of the copolymer alone in preparing rigid polyurethane foams is unacceptable due to severe handling problems of the solid material. Likewise, the alkoxylated copolymer has a hydroxyl number below about 200 which is too low to prepare an acceptable rigid foam. Likewise, when one attempts to utilize a polyether polyol defined here alone without further resort to the here defined allyl alcohol-styrene copolymer, the final rigid polyurethane foam has been found to have a dimensional stability and heat distortion temperature both too low to be acceptable for commercial applications. Thus, the total polyol combination as herein discussed is necessary to give one a rigid polyurethane foam of acceptable properties.

Any aromatic polyisocyanate may be used in the practice of the instant invention. Typical aromatic polyisocyanates include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl) methane, bis(3-methyl-4-isocyanatophenyl) methane, and 4,4'-diphenylpropane diisocyanate.

Greatly preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents, for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 weight percent methylene diphenyl diisocyanate isomers with the remainder being polymethylene polyphenyl diisocyanates having higher functionalities and higher molecular weights. Typical of these are polyphenyl polyisocyanate mixtures containing about 20 to 100 weight percent methylene diphenyl diisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. The isocyanate mixtures are known commerically available materials and can be prepared by the process described in U.S. Pat. No. 3,362,979, issued Jan. 9, 1968 to Floyd E. Bentley.

In the production of rigid polyurethane foams in the practice of the invention, other known additives are necessary. One such constituent is the blowing agent. Some examples of such material are trichloromonofluoromethane, dichlorodifluoromethane, dichloromonofluoromethane, 1,1-dichloro-1-fluoromethane, 1,1-difluoro-1,2,2-trichloroethane, chloropentafluoroethane, and the like. Other useful blowing agents including low-boiling hydrocarbons such as butane, pentane, hexane, cyclohexane, and the like. See U.S. Pat. No. 3,072,582, for example.

Surfactant agents, better known as silicone oils, are added to serve as a cell stabilizer. Some representative materials are sold under the names of SF-1109, L-520, L-521 and DC-193 which are, generally, polysiloxane polyoxyalkylene blocked copolymers, such as those disclosed in U.S. Pat. Nos. 2,834,748; 2,917,480; and 2,846,458, for example.

Should fire retardancy be required for the polyurethane foam, two types of fire retardants are available; those that are incorporated by mere mechanical mixing and those that become chemically bound in the polymer chain. Representative of the first type are tris(chloroethyl) phosphate, tris(2,3-dibromopropyl) phosphate, diammonium phosphate, various halogenated compounds and antimony oxide. Representative of the chemically bound type are chlorendic acid derivatives, and various phosphorous-containing polyols.

The catalysts which may be used to make the foams of my invention are well known. There are two general types of catalyst, tertiary amines and organo-metallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in my invention are triethylenediamine, tetramethylethylenediamine, triethylamine, tripropylamine, tributylamine, triamylamine, pyridine, quinoline, dimethylpiperazine, dimethylhexahydroaniline, piperazine, N-ethylmorpholine, 2-methylpiperazine, dimethylaniline, nicotine, dimethylaminoethanol, tetramethylpropanediamine, and methyltriethylenediamine. Useful organo-metallic compounds as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organo-metallic compound are often used together in the polyurethane reaction.

The rigid polyurethane foams prepared here can be made in one step by reacting all the ingredients together at once (one-shot process) or the rigid foams can be made by the so-called "quasi-prepolymer method". In accordance with this method, a portion of the polyol component is reacted in the absence of a catalyst with the polyisocyanate component in proportion so as to provide from about 20 percent to about 40 percent of free isocyanato groups in the reaction product, based on the polyol. To prepare foam, the remaining portion of the polyol is added and the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component, whereby at the end of the reaction a rigid polyurethane foam is provided.

In a preferred embodiment the amount of polyol combination is used such that the isocyanato groups are present in the foam in at least an equivalent amount, and preferably in slight excess, compared with the free hydroxyl groups. Preferably, the ingredients will be proportional so as to provide for about 1.05 'to about 1.5 mol equivalents of isocyanato groups per mol equivalent of hydroxyl groups.

The invention will be illustrated further with respect to the following specific examples, which are given by way of illustration and not given as limitations on the scope of this invention.

EXAMPLE I

Here a typical polyol combination of the invention was prepared.

The first component was the styrene-allyl alcohol copolymer. This particular copolymer was prepared according to the directions of U.S. Pat. No. 2,965,615 and had a $M_n$ of 1,000, 5.3 moles hydroxyl per mole and 6.6 moles styrene per mole. The weight average molecular weight of the polyol was 1,450 and its hydroxyl number was 280. The second polyol constituent was prepared in the usual manner by propoxylating triethanolamine for sufficient time to produce the polyol here having an hydroxyl number of 642.

The polyol combination was prepared by adding 260 grams (60.5 weight percent) of the above polyether polyol to a 500 ml flask. The polyether polyol was then heated up to about 100° C. under nitrogen, at which time 170 grams (39.5 weight percent) of the above described styrene-allyl alcohol resin was added. The mixture was stirred well until a homogenous, clear solution developed. Upon cooling the blended product was a viscous liquid having a viscosity at 25° C. of 30,000 cps (Brookfield) and a hydroxyl number of 506.

EXAMPLE II

A rigid polyurethane foam was prepared using the polyol blend of Example I. The formulation and foam physical properties are shown below. It should be noted that the dimensional stability and heat distortion properties of the rigid foam were excellent in both instances.

| Formulation, pbw | |
|---|---|
| Polyol blend (Example I) | 38.5 |
| Silicone Oil | 0.5 |
| Trichloromonofluoromethane blowing agent | 13.0 |
| Methylene-bridged polyphenyl polyisocyanate mixture (functionality of 2.7%) | 48.0 |
| Reaction Times (sec.) | |
| Cream | 12.0 |
| Tack Free | 55.0 |
| Rise | 75.0 |
| Physical Properties | |
| Density (lb/ft) | 1.63 |
| K-Factor | 0.120 |
| Compressive Strength, psi with (x)-rise | 40.96 |
| Compressive Strength, psi cross-rise | 10.92 |
| Heat Distortion (° C.) | 154.0 |
| Percent Closed Cells | 94.54 |
| Dimensional Stability | V  W  L |
| 158° F., 100% Rel. Humidity for one week | +2.7  −0.9  +2.0 |

EXAMPLE III

An additional polyol combination of the invention was prepared as follows.

Here the styrene-allyl alcohol copolymer had a Mn of 1150, 5.3 moles hydroxyl per mole and 8.3 moles styrene per mole. The weight average molecular weight of the polyol was 1,700 and its hydroxyl number was 249. The second polyol constituent was a 2 mole propylene oxide adduct of triethanolamine.

To a 500 ml., round bottom flask, fitted with a stirrer and thermometer was added 500 grams of a propoxylated triethanolamine which was heated up to 90°-100° C. under nitrogen. Then 270 grams (35 weight percent) of the styrene allyl alcohol copolymer was added slowly so as to prepare a homogeneous solution. The solution was vacuum stripped at 100° C. to yield a polyol combination product having a hydroxyl number of 496. The blended product had a viscosity (25° C.) of 18,000 cps (Brookfield).

EXAMPLE IV

A polyol combination was prepared as in Example III with the exception that 270 grams of the styrene-allyl alcohol copolymer of Example I was utilized. The final polyol combination had a hydroxyl number of 500, and a viscosity (25° C.) of 16,000 cps (Brookfield).

EXAMPLES V-VIII

Here further rigid polyurethane foams were prepared using the polyol blends of Examples III and IV. Results with respect to formulation details and foam physical properties are shown below.

| Formulation, pbw | 5 | 6 | 7 | 8 |
|---|---|---|---|---|
| Polyol blend (Example III) | 38.6 | 28.72 | — | — |
| Polyol blend (Example IV) | — | — | 38.5 | 28.64 |
| Fyrol 6[(1)] (OH=460) | — | 7.18 | — | 7.16 |
| Firemaster T-23-P[(2)] | — | 6.0 | — | 6.0 |
| Silicone Oil | 0.5 | 0.5 | 0.5 | 0.5 |
| Trichloromono fluoromethane (blowing agent) | 13.0 | 12.0 | 13.0 | 12.0 |
| Methylene-bridged polyphenyl polyisocyanate mixture (functionality of 2.7) | 47.9 | 45.6 | 48.0 | 45.7 |
| Isocyanate Index | 105 | 1.10 | 1.05 | 1.10 |
| Mixing Time (sec.) | 12 | 12 | 12 | 12 |
| Cream Time (sec.) | 20 | 16 | 17 | 16 |
| Tack Free Time (sec.) | 60 | 60 | 58 | 58 |
| Rise Time (sec.) | 130 | 130 | 110 | 105 |
| Initial Surface Friability | None | None | None | None |
| Foam Appearance | Good | Good | Good | Good |
| Density (lb./ft.³) | 1.91 | 1.66 | 1.90 | 1.89 |
| K-Factor | 0.121 0.126 | 0.117 | 0.124 | |
| Compressive Strength | | | | |
| psi, with rise | 47.59 | 40.69 | 44.89 | 41.91 |

-continued

|  | | | | | | | | | | | | |
|---|---|---|---|---|---|---|---|---|---|---|---|---|
| psi, cross rise | | 15.19 | | 13.12 | 14.44 | | 13.22 | | | | | |
| Heat Distortion (° C.) | | 141 | | 162 | 144 | | 162 | | | | | |
| Percent Closed Cells | | 94.26 | | 94.05 | 94.67 | | 94.19 | | | | | |
| Friability (% wt, loss) | | 1.09 | | 0.8 | 1.4 | | 3.4 | | | | | |
| Butler Chimney Test | | | | | | | | | | | | |
| Flame height (in.) | | — | | 8.8 | — | | 10 | | | | | |
| Seconds to Extinguish | | — | | 13.7 | — | | 14.7 | | | | | |
| % Closed Cells | | — | | 80.6 | — | | 84.8 | | | | | |
| Dimentional Stability | ΔV | ΔW | ΔL | ΔV | ΔW | ΔL | ΔV | ΔW | ΔL | ΔV | ΔW | ΔL |
| 158° F., 100% RH, 1 week | +4.7 | 0 | +2.5 | +10.2 | −1.4 | +8.5 | +5.3 | 0 | +3.0 | +25.5 | −1.6 | +19.0 |
| 200° F., Dry, 1 week | +3.7 | 0 | +2.0 | + 2.5 | 0 | +1.7 | +3.5 | +0.1 | +2.0 | + 2.7 | −0.2 | + 1.7 |
| −20° F., Dry, 1 week | −2.2 | +0.4 | −1.4 | − 7.7 | +0.5 | −7.0 | −2.7 | +0.7 | −1.5 | − 3.7 | +0.2 | − 3.0 |

(1)Fire retardant difunctional phosphorous ester from Stauffer Chemical Co.
(2)Brominated phosphorous ester from Michigan Chemical Co.

EXAMPLE IX

Here, a neutral polyol blend was prepared as follows. To a 1 liter, round bottom, 3-necked flask, fitted with a mechanical stirrer, thermometer and nitrogen flow system was added 500 grams of a polypropylene glycol having a molecular weight of about 400 (hydroxyl number = 272). The water white polyol was heated under nitrogen to 100° C. Thereafter, 270 grams of the styrene-allyl alcohol copolymer described in Example III was slowly added to the glycol. The resultant homogeneous solution was stripped under high vacuum to about 1-2 mm. Hg/110° C. The product was a slightly viscous liquid of low color having a viscosity (25° C.) of 4,000 cps (Brookfield), and a hydroxyl number of 272.

I claim:

1. A rigid polyurethane foam obtained by reacting in the presence of a blowing agent and a catalyst of polyurethane formation, an organic polyisocyanate and a polyol combination comprising 5-85 percent by weight of a copolymer of allyl alcohol and styrene and 15-95 percent by weight of a polyether polyol having a hydroxyl number ranging from about 200 to about 800, said weight percentages being based on the total weight of said polyol combination.

2. The rigid polyurethane foam of claim 1 wherein said polyol combination has a hydroxyl number ranging from about 300 to about 700.

3. The rigid polyurethane foam of claim 2 wherein said polyol combination has a hydroxyl number ranging from about 400 to about 600.

4. The rigid polyurethane foam of claim 1 wherein said copolymer comprises 10-90 weight percent each of allyl alcohol and styrene based on the weight of said copolymer.

5. The rigid polyurethane foam of claim 4 wherein said copolymer comprises 40-80 percent by weight of allyl alcohol and 20-60 percent by weight of styrene.

6. The rigid polyurethane foam of claim 1 wherein said polyether polyol is the reaction product of a polyfunctional active hydrogen initiator and propylene oxide, ethylene oxide or mixed propylene oxide and ethylene oxide.

7. The rigid polyurethane foam of claim 6 wherein said initiator has a functionality of 2-6.

8. The rigid polyurethane foam of claim 7 wherein said polyfunctional active hydrogen initiator is selected from the group consisting of monoethanolamine, diethanolamine, triethanolamine, ethylene glycol, polyethylene glycol, propylene glycol, polypropylene glycol, glycerine, sorbitol, and trimethylolpropane.

9. The rigid polyurethane foam of claim 6 wherein said polyether polyol is the reaction product of propylene oxide and triethanolamine.

10. The rigid polyurethane foam of claim 1 wherein said polyol combination comprises 40-80 weight percent of said polyether polyol and 20-60 weight percent of said copolymer.

11. A method for producing a rigid polyurethane foam which comprises reacting in the presence of a blowing agent and a catalyst of polyurethane formation, an organic polyisocyanate and a polyol combination comprising 5-85 percent by weight of a copolymer of allyl alcohol and styrene and 15-95 percent by weight of a polyether polyol having a hydroxyl number ranging from about 200 to about 800, said weight percentages being based on the total weight of said polyol combination.

12. The method of claim 11 wherein said organic polyisocyanate is employed in an amount sufficient to provide 1.05 to 1.5 mol equivalents to isocyanato groups per mole equivalent of hydroxyl groups present in said polyol combination.

13. The method of claim 11 wherein said polyether polyol is the reaction product of a polyfunctional active hydrogen initiator and propylene oxide, ethylene oxide, or mixed propylene oxide and ethylene oxide.

14. The method of claim 11 wherein said polyfunctional active hydrogen initiator has a functionality of 2-6.

15. The method of claim 11 wherein polyfunctional active hydrogen initiator is selected from the group consisting of monoethanolamine, diethanolamine, triethanolamine, ethylene glycol, propylene glycol, polypropylene glycol, glycerine, sorbitol, and trimethylolpropane.

* * * * *